UNITED STATES PATENT OFFICE.

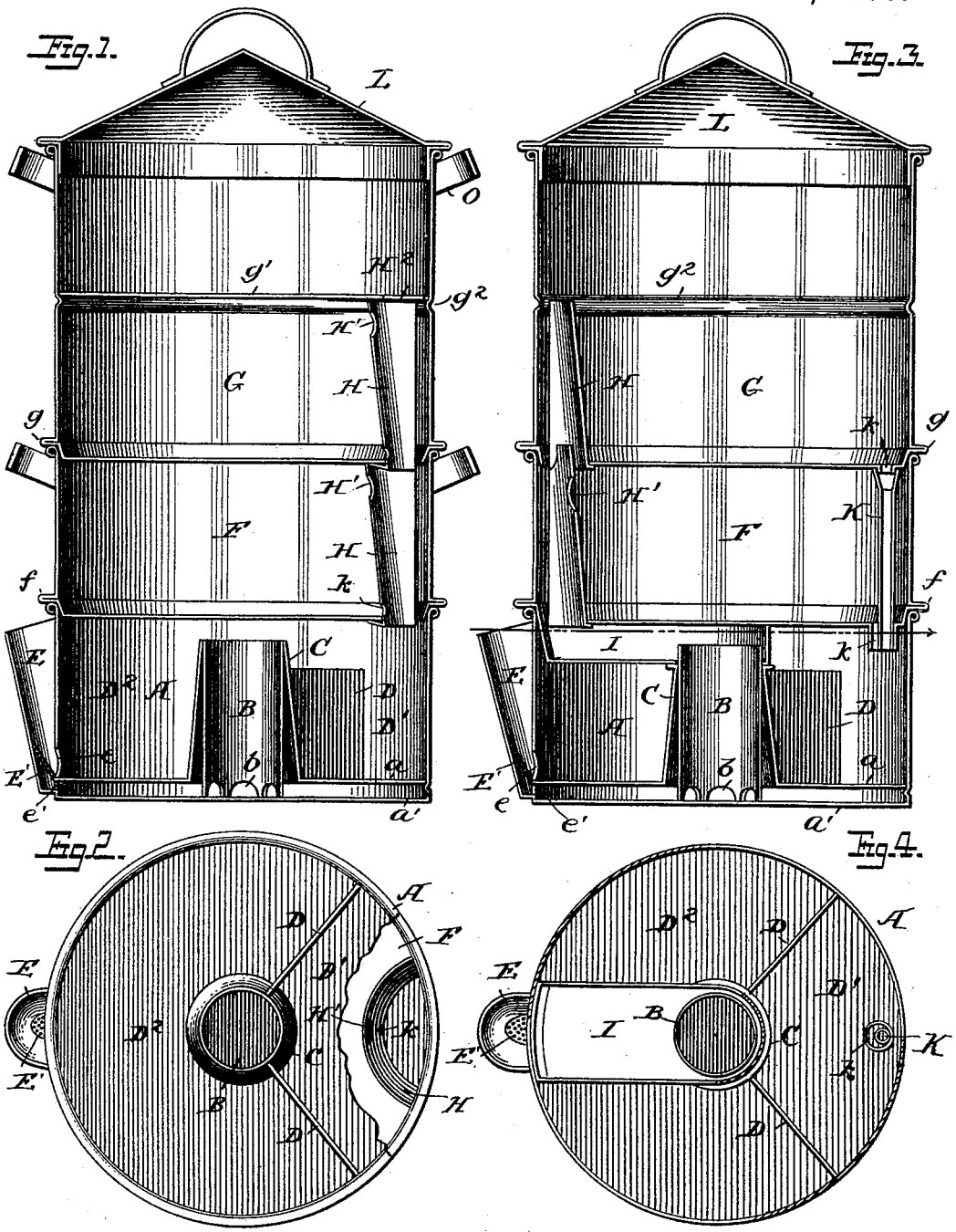

WILLIAM F. DAGGETT, OF CHICAGO, ILLINOIS.

STEAM-COOKER.

SPECIFICATION forming part of Letters Patent No. 500,118, dated June 27, 1893.

Application filed June 11, 1892. Serial No. 436,366. (No model.)

*To all whom it may concern:*

Be it known that I, WILLIAM F. DAGGETT, a citizen of the United States, and a resident of Chicago, Cook county, Illinois, have invented certain new and useful Improvements in Steam-Cookers, of which the following is a specification.

My invention relates to steam cookers and has for its object to improve and simplify the construction and arrangement of such devices and provide means whereby all kinds of foods may be thoroughly and properly cooked, with the aid of steam and at an expenditure of little heat, and to these ends my invention consists in the various features of construction, arrangement and operation, substantially such as are herein more particularly pointed out.

Referring to the accompanying drawings:—Figure 1, is a vertical section of a cooker embodying my invention. Fig. 2, is a plan view of the bottom section of the cooker. Fig. 3, is a vertical section of a different arrangement of cooker; and Fig. 4, is a plan view of the bottom section thereof.

The fact that food cooked by steam is more palatable, easier to digest and more nourishing than food cooked in other ways is fast becoming recognized and it is one of the objects of my invention to provide a simple, convenient and practical cooker, whereby this method of cooking may be readily carried out.

The cooker is made in sections, so that one or more different articles can be cooked at the same time and the flavor of one article will not interfere or mix with the flavor of another and but a small amount of heat need be applied to the device while the food being cooked will be subjected to a uniform heat.

In the drawings above referred to, I have illustrated the preferred embodiment of my invention in which the cooker comprises a lower section A, which I have termed the water section. This section which may be of any convenient size and shape and made of any material, although there is preferably provided a double bottom $a, a'$, the lower bottom $a'$, preferably being made of copper and adapted to fit over the ordinary stove hole or rest thereon or otherwise be in a position to receive heat. Arranged preferably in the center of the water section is an upright tube B, extending through the bottom $a$, and scalloped or recessed as at $b$, to furnish ready communication with the space between the two bottoms. Connected to the upper portion of this tube is a cone C, which communicates with the bottom A, leaving a space between the cone and the tube so that water which may be in the water section A, will not come in contact with the sides of the tube.

The water section is divided as by partition D, to form two water receptacles $D^2$, being the receptacle for the fresh water which is to be converted into steam, and $E'$, the receptacle for the water of condensed steam. A filling mouth or spout E is attached preferably to one side of the water section and communicates with the fresh water receptacle through the opening $e$, while it also communicates with the space between the bottoms by a small opening $e'$, and this opening is protected by a screen $E'$, preferably placed at an angle, as shown, so as to avoid clogging and at the same time prevent impurities entering between the water sections. The amount of water in the water section can be readily determined by observing the height of the water in the spout. It will be seen that the space between the bottom is comparatively small, usually being about half an inch, as shown, so that the amount of water contained in this space is comparatively small, usually about a pint and this is the amount of water that is kept boiling to furnish the steam for cooking and as the water is evaporated a supply is fed from the upper water section through the openings $e, e'$, while the steam passes upward through the tube B. In this way only a very small amount of heat is required to maintain the cooker in operation, there being practically but a pint of water necessarily heated to the boiling point and the steam rising therefrom passes upward through the tube which is out of contact with the main body of water in the compartments $D', D^2$.

The sections F, G, &c., and there may be any desired number of them, are each adapted to fit or nest with each other and with the water section A, the bottom of each section furnishing a cover for the water section or for the other cooking sections, they preferably being provided with flanges $f$, fitting on the top of the section below. Arranged at some convenient point in this section is a tube or passage H, and I have shown these passages arranged at one side of each section and preferably tapering from the top toward the bottom; and these tubes or passages of the different sections are arranged to enter into or receive the corresponding tubes or passages of the next section. These tubes are also provided with openings H', toward their tops to permit the steam to pass into the respective sections in contact with the food therein.

The bottom cooking section F, is preferably provided with a passage-way I, as shown in Figs. 3 and 4, secured to its bottom which is provided with an opening adapted to fit over the tube B, so as to furnish a constant passage-way from the heated water to the cooking vessels, but sometimes I have found it sufficient to omit this passage-way as the steam will find its way from the tube B, to the tube H, as illustrated in the construction shown in Fig. 1.

Some means should be provided to permit the water from the condensed steam to be discharged from the cooking vessels and I have shown in Fig. 3, an opening $k$, in the bottoms of the cooking vessels adapted to discharge the contents of the vessel into the tube K, of the vessel below and in the water section I have shown a compartment D', before referred to, for receiving the condensed water.

In the construction shown in Fig. 1, I dispense with the additional tube K, and provide an opening $k$, in the lower portion of the tube H, and through this opening the condensed steam can pass and be discharged into the proper receptacle.

It will be observed that the lower end of the pipe K, extends below the bottom and the edges of the opening $k$ also extend sufficiently below the bottom to prevent the water of the condensed steam crawling along the bottom and falling into the pure water receptacle. It will thus be seen that only the steam from the fresh pure water passes to the separate cooking compartments as the steam which is condensed in the different compartments is discharged and held in the receptacle D', and by this arrangement there is absolutely no danger of one article becoming flavored by the steam or flavor from another article being cooked at the same time in the vessel above or below it and this constitutes an important advantage of my cooker. Moreover the pressure of the steam entering the respective cooking sections retains the flavor of the articles being cooked in each section.

In order to adapt the cooker for the purpose of putting up fruit in jars or otherwise in canning fruit, I preferably make one of the cooking sections, as G, deep enough to receive the jars or cans containing the fruit or other material inclosed therein, and this may be provided with a division as $g$, being a flanged edge disk, which can rest on a rub $g^2$, so that it may be otherwise used for cooking separate articles, the division being provided with an opening $H^2$, to permit the steam to enter the upper portion of the section, and drain off the condensed steam. The upper section of the cooker of course is provided with a proper cover L, and suitable handles O, may be attached to the various sections for convenience. It will thus be seen that my cooker provides for cooking many and various articles by steam, preserving their individual flavors and by the expenditure of a minimum amount of heat, only a small portion of the water being heated to a degree to generate steam at one time and this supply is maintained automatically while the waters of condensation in no way interfere with the process of cooking to mar their flavor, and the whole construction is simple, cheap and effective for the purposes desired.

While I have shown the preferred embodiment of my invention and sufficient to explain the principles thereof, it will be understood that the details of construction and arrangement may be varied by those skilled in the art without departing from the general principles of my invention, and I do not limit myself therefore to the precise construction and arrangement shown.

What I claim is—

1. A steam cooker, the water section of which is provided with a double bottom, a filling spout and openings from the filling spout to the spaces above and below the upper bottom, substantially as described.

2. A steam cooker, the water section of which is provided with a double bottom, a spout having openings into the spaces above and below the upper bottom and a sieve over the opening to the lower space, substantially as described.

3. A steam cooker, the water section of which is provided with a double bottom, the space above the upper bottom being divided into two receptacles, the one for pure water, and the other for the water of condensation, and connections between the receptacle for pure water and the space between the double bottoms, substantially as described.

4. In a steam cooker, the water section provided with a double bottom, the upper portion being divided into two spaces for the reception of the pure water and the condensed water, connections between the pure water space and the space between the bottoms and a tube extending through the upper bottom and connecting the space between the bottoms with the upper portion of the vessel, substantially as described.

5. In a steam cooker, the combination with the water section having a double bottom and a tube extending upward through the upper bottom, of the cooking sections each provided with a tube for the passage of steam and with a passage-way secured to the bottom of the cooking section adapted to fit the tube in the water section, substantially as described.

In testimony whereof I have signed my name to this specification in the presence of two subscribing witnesses.

WILLIAM F. DAGGETT.

Witnesses:
C. F. SCOTT,
GRANVILLE PADDON.